(12) United States Patent
Pichkhadze et al.

(10) Patent No.: US 6,607,166 B1
(45) Date of Patent: Aug. 19, 2003

(54) INFLATABLE FLYING BODY FOR THE RESCUE DESCENT OF A PERSON

(75) Inventors: Konstantin Pichkhadze, Moscow (RU); Igor Zaytsev, Khimki (RU); Stephan Walter, Weyhe (DE)

(73) Assignee: Astrium GmbH, Ottobrunn (DE)

( * ) Notice: Subject to any disclaimer, the term of this patent is extended or adjusted under 35 U.S.C. 154(b) by 0 days.

(21) Appl. No.: 10/214,284

(22) Filed: Aug. 6, 2002

(51) Int. Cl.[7] .............................. B64D 25/14; B64G 1/14
(52) U.S. Cl. ..................... 244/138 R; 244/160; 244/141
(58) Field of Search .............................. 244/138 R, 141, 244/140, 146, 160

(56) References Cited

U.S. PATENT DOCUMENTS

| | | | |
|---|---|---|---|
| 2,700,518 A | | 1/1955 | Ryno et al. |
| 3,217,325 A | * | 11/1965 | Mullin |
| 3,286,951 A | * | 11/1966 | Kendall ................. 244/160 |
| 3,405,887 A | * | 10/1968 | Mixson ................. 244/160 |
| 3,410,511 A | * | 11/1968 | Coppa ................. 244/138 R |
| 3,433,435 A | * | 3/1969 | Alai ..................... 244/160 |
| 3,520,503 A | * | 7/1970 | McGehee ............ 244/138 R |
| 3,768,761 A | * | 10/1973 | Cramer ............... 244/138 R |
| 3,921,944 A | * | 11/1975 | Morrison ............. 244/138 R |
| 4,105,173 A | * | 8/1978 | Bucker ................. 244/146 |
| 5,044,579 A | * | 9/1991 | Bernasconi et al. .... 244/158 R |
| 5,259,574 A | | 11/1993 | Carrot |
| 5,265,829 A | * | 11/1993 | Roberts ................. 244/160 |
| 6,237,875 B1 | | 5/2001 | Menne et al. |
| 6,264,144 B1 | * | 7/2001 | Thornton .............. 244/160 |
| 6,467,731 B1 | * | 10/2002 | Harris et al. ........... 244/160 |

FOREIGN PATENT DOCUMENTS

| | | |
|---|---|---|
| CA | 535577 | 1/1957 |
| DE | 3247694 | 6/1984 |
| FR | 2664233 | 1/1992 |
| GB | 572152 | 9/1945 |
| GB | 604938 | 7/1948 |
| GB | 842370 | 7/1960 |

* cited by examiner

*Primary Examiner*—Michael J. Carone
*Assistant Examiner*—Lulit Semunegus
(74) *Attorney, Agent, or Firm*—W. F. Fasse; W. G. Fasse

(57) ABSTRACT

A person can safely descend from a burning high-rise building or the like using an inflatable flying body that has a hollow conical form in an inflated deployed condition, but is deflated and folded into a backpack form in a stowed condition. The flying body includes an upper stabilizing ring, a lower nose structure with a pneumatic damping body, spoke struts extending conically therebetween, a cover skin covering the abovementioned inflatable components to form the conical outer surface and provide aerodynamic braking drag, and gas generators to inflate the inflatable components. A person straps on the apparatus in the stowed backpack form and pulls a handle to actuate the gas generators for inflating the apparatus, whereby the expanding apparatus ejects the person from the building and then orients itself in a nose-down attitude during the descent. The pneumatic damping body damps and dissipates the landing impact energy.

22 Claims, 5 Drawing Sheets

INFLATABLE FLYING BODY FOR THE RESCUE DESCENT OF A PERSON

FIELD OF THE INVENTION

The invention relates to a method and a system utilizing an inflatable flying body for rescuing a person from a great height in an emergency, for example in the event of a fire or the like in a high-rise building, a tower, or even an aircraft.

BACKGROUND INFORMATION

It has not been possible in practice to provide an automatic and self-contained rescue system for rescuing persons who are trapped in a dangerous situation at a great height, for example in a fire in a high-rise building, or even in an aircraft in an emergency situation. While it may be possible to use a typical parachute in some emergency situations, for enabling the endangered person to descend to the ground, it must be considered that the use of a parachute requires considerable instruction, training, and prior practice in order to ensure that a reliable and safe descent can be achieved. However, a method and system for rescuing persons from a great height in an emergency situation must be suitable for rescuing persons who do not have any special training or skills. Therefore, the use of a parachute or the like is not practically suitable for rescuing ordinary persons in such emergency situations.

Furthermore, it has been found in practice, especially in connection with an evacuation of a high-rise building which is on fire or subject to other emergency conditions, that even persons who are trained and experienced in parachuting under good conditions are not able to execute a safe parachute jump in such an emergency situation. For example, the stress of the situation can interfere with the person's orderly conduct of the necessary procedures for carrying out the parachute jump. Moreover, a fire-induced suction effect, or even just a natural updraft along the building can make it impossible to properly deploy and control the parachute and has a tendency to violently swing the parachute and the suspended person into the sidewall of the building. Also, the heat of the fire may destroy a parachute canopy or injure the suspended parachutist especially if it is necessary to jump or descend directly through flames. As a further difficulty, the ground around the base of the building may not be suitable for making a safe parachute landing. For these reasons, a parachute is not a suitable means of emergency rescue descent from a burning building or the like, even for a person who is an experienced parachutist.

SUMMARY OF THE INVENTION

In view of the above, it is an object of the invention to provide a system and method for rescuing unskilled and untrained ordinary persons from an emergency situation at a great height. It is a further object of the invention to provide an apparatus that is automatically deployable once it is actuated, and that automatically orients itself for a safe descent regardless of the orientation of its deployment. Yet another object of the invention is to provide an apparatus that at least partially encloses and shields a person from fire and debris and the like, provides aerodynamic braking drag for a controlled slow descent, and provides pneumatic cushioning and shock damping of the landing impact force, to achieve a safe, survivable landing without requiring any special landing area on the ground and without requiring any special landing skills or efforts by the person. A further object of the invention is to enable the safe descent of any sort of payload or valuable cargo separately from a person. Still another object of the invention is to provide an apparatus that safely and automatically ejects a person from a building or the like, without requiring the person to consciously jump from the building for being rescued. The invention further aims to avoid or overcome the disadvantages of the prior art, and to achieve additional advantages, as apparent from the present specification.

The above objects have been achieved according to the invention in an unfoldable, inflatable, and thus deployable flying body having a folded or stowed configuration as well as an inflated deployed configuration. In the inflated deployed configuration, the apparatus generally forms a conical hollow body, substantially similar in shape to a badminton shuttlecock. This conical hollow body includes a nose structure having an inflatable central pneumatic damping body or airbag that forms the bottom conical point or nose of the hollow body, an inflatable toroidal outer stabilizing ring that forms the open larger end at the top of the hollow body, a plurality of inflatable spoke struts extending conically between the nose structure and the outer stabilizing ring, and a cover skin arranged over at least the spoke struts to form an outer covering or sheath skin of the conical hollow body. A receiver or load support element, e.g. a load bearing frame, is secured to or incorporated in the nose structure on top of the pneumatic damping body, e.g. on an upper surface thereof facing toward the outer upper stabilizing ring. At least one gas generator is provided for inflating the inflatable components. Preferably, separate gas generators are provided for inflating the pneumatic damping body on the one hand, and the inflatable spoke struts and stabilizing ring on the other hand.

Throughout this disclosure, directional terms such as "upper", "lower", "above", "below", etc. are to be understood with respect to the normal flying descent attitude in the deployed condition of the apparatus, with the point or narrow nose end of the conical hollow body being pointed downward.

In the initial uninflated, stowed condition, the pneumatic damping body, the spoke struts, and the outer stabilizing ring are uninflated, and are folded together with the cover skin into a compact package, e.g. in the form of a self-contained backpack. The load support element such as the load bearing frame can form a backpack frame that is secured onto the back of a person using securing elements such as straps with a chest buckle or the like. Then, to deploy the apparatus into the abovementioned deployed condition, the one or more gas generators are manually actuated to inflate the pneumatic damping body, the spoke struts, and the outer stabilizing ring to a slight over-pressure so as to maintain the inflated deployed condition of the apparatus with a somewhat rigid, non-collapsing, form-stable shape. The load bearing frame remains secured to the person's back as the apparatus is inflated and thereby deployed, so that the person suddenly finds himself or herself strapped securely to the load bearing frame on top of the pneumatic damping body within the hollow interior space of the conical hollow body surrounded by the conical walls formed by the spoke struts, the cover skin, and the outer stabilizing ring.

The inflation and deployment process should be very rapid, for example the entire time required for strapping on the folded and stowed apparatus in the backpack configuration, actuating the gas generators, and then fully inflating the hollow conical body should not exceed 10 seconds. The actual inflation of the inflatable components itself is rather rapid in an explosive manner, e.g. in less than 1 second or particularly in the range of 20 to 40 milliseconds. This can be achieved by the gas generators embodied in any conventionally known manner, for example in the manner of conventional gas generators used for inflating automotive occupant restraint airbags and the like. Such a gas generator can be mechanically, electrically, or electro-mechanically triggered. Typically, such a gas generator uses a pyrotechnic charge for explosively generating the required inflation gas.

In the inflated deployed condition, especially with the person strapped securely to the load support element, the hollow conical body is configured and embodied so as to have a center of gravity substantially along a central axis thereof at a point below the center of aerodynamic drag. Thereby, the deployed apparatus in the form of a hollow conical body is aerodynamically stable and self-orienting so that it will always tend to descend in a nose-down attitude, i.e. with the point or narrower vertex end of the conical body oriented downward, e.g. in the manner of a badminton shuttlecock.

With the above described rapid inflation and total deployment of the hollow conical body, the apparatus is suitable for use for an evacuation descent from any altitude of at least 5 meters. In other words, a minimum altitude of 5 meters is required to ensure that the hollow conical body will become completely inflated and self-oriented in the nose-down attitude before the landing impact or touchdown on the ground.

The conical body, and particularly the cover skin together with the supporting spoke struts and the outer stabilizing ring, provide an aerodynamic braking drag effect that slows the descent and limits the descent to a maximum designed terminal velocity, e.g. preferably not greater than 8.5 m/sec (approximately 19 mph). The landing impact is then cushioned by the pneumatic damping body that acts as an airbag. The pneumatic damping body, and other inflatable components of the apparatus, can be equipped with over-pressure venting valves or rupturable venting membranes or the like, to vent gas out of these components in a controlled manner at a controlled rate during the impact, so as to pneumatically cushion, distribute over time, and dissipate the landing impact energy. Particularly, the overload at touchdown should be less than 15 units, the rate of increasing the G force load should be 200 units/sec, and the time of action of overloading should be not more than 0.5 sec.

The load support element preferably includes a load bearing frame that forms a backpack frame as described above. The load support element may further or alternatively comprise a load support platform that is arranged and secured on the upper surface of the pneumatic damping body and is provided with the securing elements such as straps and one or more buckles. Such a platform thus forms a backboard on which the other components are secured and mounted to form the stowed backpack configuration. This platform may be planar, or may be contoured to generally fit the contours of the person's back. As a further alternative, the load support element may comprise a membrane in the manner of a soft, flexible, yet strong fabric that is arranged in or on or even slightly above the pneumatic damping body, and that may have the load bearing frame secured thereto.

In one advantageous embodiment, the pneumatic damping body comprises an inflatable spherical airbag or damping element, which forms the nose of the generally conical hollow body. In a second alternative advantageous embodiment, the pneumatic damping body comprises an inflatable conically tapering ring element, generally in the shape of an inflatable funnel, which forms the conically tapering nose of the generally conical hollow body.

As a further optional feature, to improve the stabilization, the conical hollow body can further comprise a second inner or lower inflatable stabilizing ring that is secured to the pneumatic damping body to form a part of the nose structure. In this case, the spoke struts extend between the inner lower stabilizing ring and the outer upper stabilizing ring. If necessary for achieving the required stability of the apparatus in the deployed condition in a particular application, it is further possible to provide one or more additional stabilizing rings between the upper and lower stabilizing rings, and it is additionally possible to provide inflatable cross-brace members spanning across the open diameter of the upper outer stabilizing ring (e.g. to ensure that the stabilizing ring maintains its open ring shape without collapsing or deforming).

The various components of the apparatus are made of any conventionally available suitable materials, which are especially strong, durable, and lightweight. The various inflatable components, e.g. the inflatable stabilizing ring, the inflatable spoke struts, and the inflatable pneumatic damping body, are made of a strong, but flexible gas-tight fabric, i.e. a fabric that is impermeable by the inflation gas. This fabric may be a single ply, or may be a multi-ply or multi-layer fabric, for example including a base fabric layer and a gas-tight coating layer thereon. The cover skin, including the cover skin portion on the conical aerodynamic braking drag arrangement and the cover skin portion on the pneumatic damping body, is made of a high strength fabric that is preferably also a high temperature heat resistant fabric able to withstand the temperatures of brief, direct flame contact. This fabric is substantially impermeable to air, but does not need to be completely airtight.

The load bearing frame is preferably made of a lightweight metal profile member, for example an aluminum alloy hollow tube having a round or angular cross-section, or an angle profile such as an L-profile. The membrane and other flexible load bearing elements of the load support structure are made of a high-strength fabric. The load support platform or backboard can be made of a fiber-reinforced composite or of a metal laminate, for example including a honeycomb core or the like. The several components are connected together by stitching, riveting, adhesive bonding, thermal lamination and bonding, or any other suitable conventionally known bonding or joining techniques.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
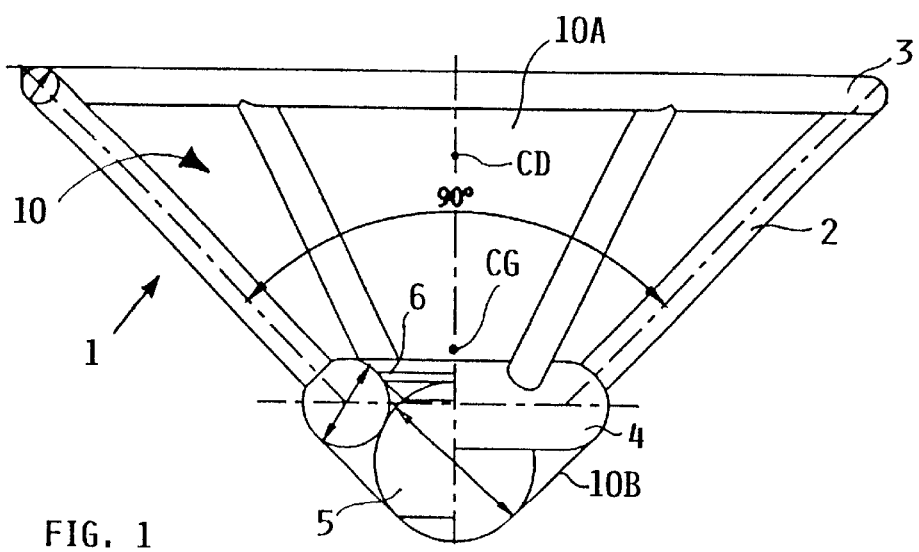
FIG. 1 is a partly sectioned side view of a first embodiment of an apparatus according to the invention with a spherical pneumatic damping body, in the inflated deployed condition.
Figure 2:
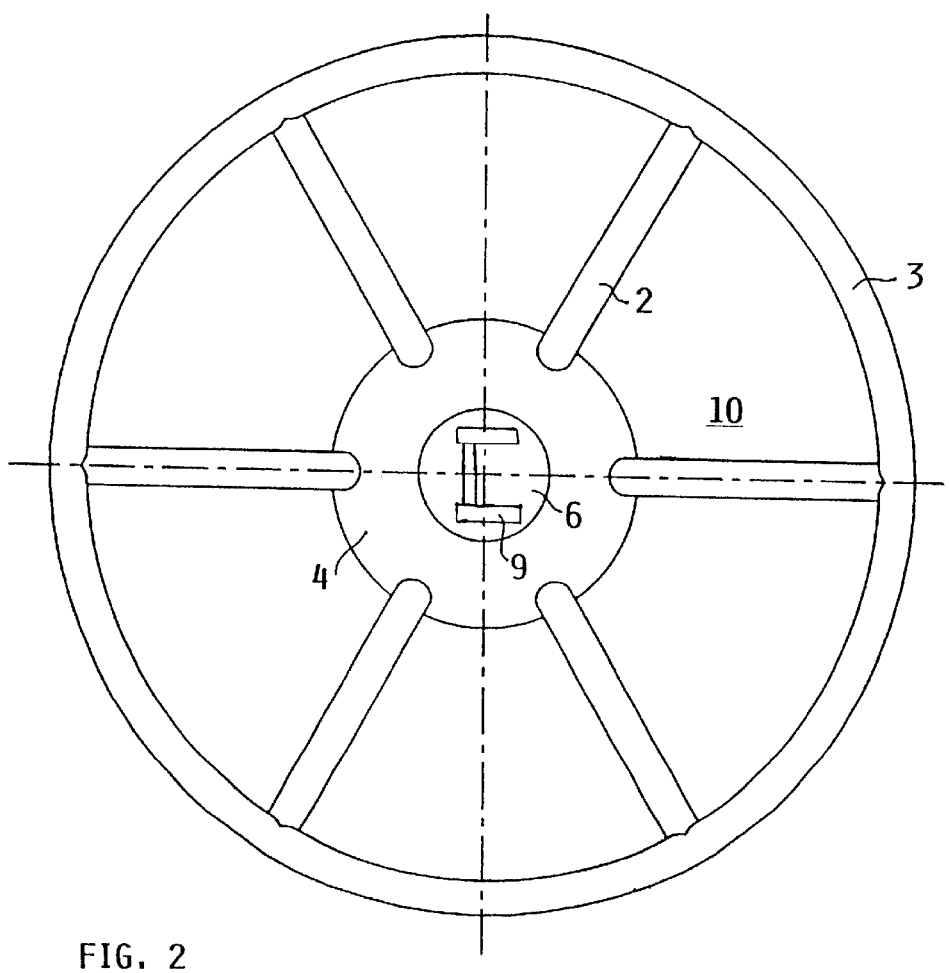
FIG. 2 is a top plan view of the apparatus according to FIG. 1.

As shown in FIGS. 1 and 2, the apparatus according to the invention is an unfoldable, inflatable and thus deployable flying body 1 that has a generally conical shape, much like a badminton shuttlecock, in the inflated, deployed condition. The deployed flying body 1 is thus generally configured as a conical hollow body of which the generally conical outer surface is closed, while the flat planar base surface at the top thereof is open. The flying body 1 according to the first embodiment includes an inflatable spherical central airbag or pneumatic damping body 5, an inflatable lower inner stabilizing ring 4 secured to the damping body 5, an inflatable upper outer stabilizing ring 3, and plural (e.g. six) inflatable spoke struts 2 extending and interconnected between the inner lower stabilizing ring 4 and the outer upper stabilizing ring 3. Each of these elements, the pneumatic damping body 5, the stabilizing rings 3 and 4, and the spoke struts 2, are made of substantially gas-tight fabric and are selectively deflatable and foldable to be stowed, or unfoldable and inflatable to be deployed into the deployed condition shown in FIG. 1.

Additionally, the generally conical flying body 1 includes a cover skin 10, e.g. comprising a cover skin portion 10A covering and spanning between the respective spoke struts 2, and a cover skin portion 10B covering and spanning between the pneumatic damping body 5 and the inner lower stabilizing ring 4. The cover skin 10, 10A, 10B is preferably made of a high temperature heat resistant fabric that is substantially airtight. Thereby, this cover skin 10 provides thermal protection from the high temperatures of a fire in a building that is being evacuated, so as to protect the other components of the flying body 1, as well as the person that is being rescued using the flying body 1. The cover skin 10, and especially the cover skin portion 10A, also provides the primary aerodynamic braking drag when the flying body 1 is deployed such that the cover skin 10 forms the substantially conical outer surface thereof.

In order to support and secure a person 7 on the flying body 1, and vice versa, the flying body 1 further includes a load receiver or load support element 6 that may be in the form of a load platform, load membrane, and/or load bearing frame that is integrated with, arranged on, or arranged slightly above the top of the pneumatic damping body 5, and preferably secured to the lower inner stabilizing ring 4. A system of securing elements 9 such as straps and buckles is provided on the load support element 6 and adapted to secure a person 7 thereon (see e.g. FIGS. 3, 4, 6 and 8). The load support element 6, such as the membrane 8, the backboard, and/or the load bearing backpack frame, additionally serves to uniformly distribute the loads acting on the person 7 from the flying body 1 during the descent and landing touchdown.

In the deployed condition, and especially with the person 7 secured thereto, the flying body 1 has an aerodynamic configuration and a mass distribution so that a center of gravity CG is located along a central vertical axis of the flying body 1, at a point below the center of aerodynamic drag CD that is also located on this central vertical axis. Thus, the center of gravity CG is located at a position on or near the load support element 6, while the center of aerodynamic drag CD is located near the plane of the upper outer stabilizing ring 3. With this arrangement, the flying body 1 has a self-orienting characteristic, so that it will always tend to orient itself in a nose-down attitude as shown in FIG. 1, i.e. with the tapering nose of the conically shaped flying body 1 oriented downwardly toward the ground when the flying body 1 is flying, i.e. floating or descending, from an escape location at an elevation of at least 5 m down to the ground.

Thus, as long as the flying body 1 has completely inflated and deployed and had sufficient time to orient itself into the nose-down attitude, which is ensured for every deployment elevation of at least 5 m, the flying body 1 will always touch down or land on the ground in a generally nose-down attitude, whereby the pneumatic damping body 5 is at least one of the first components to contact the ground. Some tilting of the flying body 1 out of the perfect nose-down attitude is possible and acceptable, and does not detract from the safe operation of the apparatus. For example, the lower stabilizing ring 4 or even one of the spoke struts 2 might also contact the ground during the touchdown impact. Generally, with a proper aerodynamic design and mass balance, the pneumatic damping body 5 will receive the majority of the touchdown impact force and energy.

Preferably, the configuration of the flying body 1 is designed to provide sufficient drag (depending on the weight of the person to be rescued) so as to limit the descent velocity to a maximum terminal velocity of no more than 8.5 m/sec. This also correspondingly limits the impact force and energy. It has been found that such results can be achieved with a configuration of the flying body as follows. The generally conical hollow body (and particularly the spoke struts 2 thereof) preferably spans a conical angle in a range from 80 to 1000, or particularly about 90° (±3°). Suitable example dimensions of components of the apparatus for the safe descent of an adult person having a typical body weight (e.g. 60 to 90 kg) are as follows: the toroidal upper outer stabilizing ring 3 has an outer diameter of 6 m, the toroid of this outer upper stabilizing ring 3 has a cross-sectional diameter of 0.25 m, the lower inner stabilizing ring 4 has a cross-sectional diameter of 0.6 m, the spherical airbag or pneumatic damping body 5 has a diameter of 1.1 m, and the overall conical body of the flying body 1 in the deployed condition has a vertical height of 3.2 m, measured from the tip of the generally conical nose to the upper flat plane defined by the upper end of the outer stabilizing ring 3. On the other hand, in the deflated, folded and stowed backpack configuration, the inflatable apparatus has a total packing volume of 27 liters and a total weight of about 20.9 kg, including 9.4 kg for the envelope, 0.25 kg for the reefing system, 8 kg for the gas generator system, and 3.25 kg for the backpack system.

Figure 3:
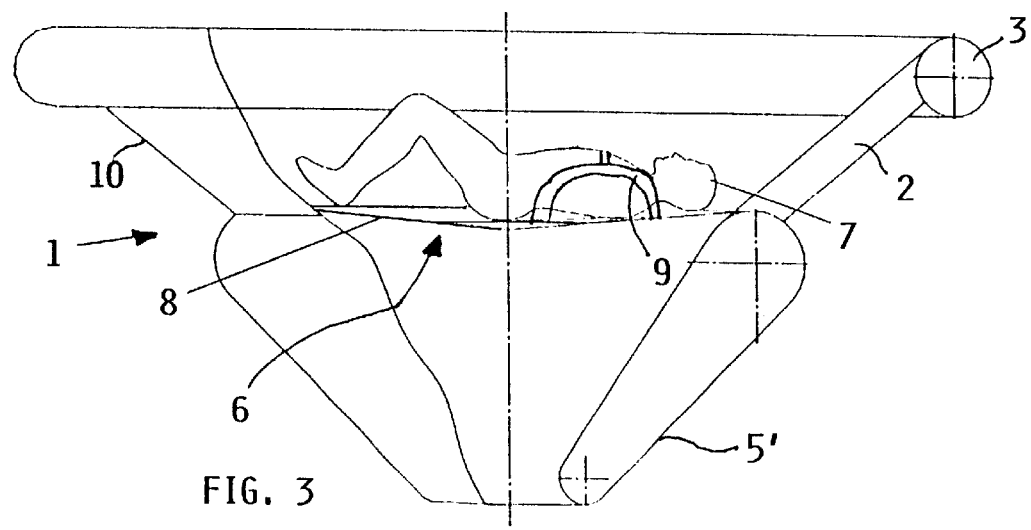
FIG. 3 is a partly sectioned side view similar to that of FIG. 1, but showing a second embodiment of the inventive apparatus with a conical ring-shaped pneumatic damping body, in the deployed condition, with a person to be rescued secured thereon.
Figure 4:
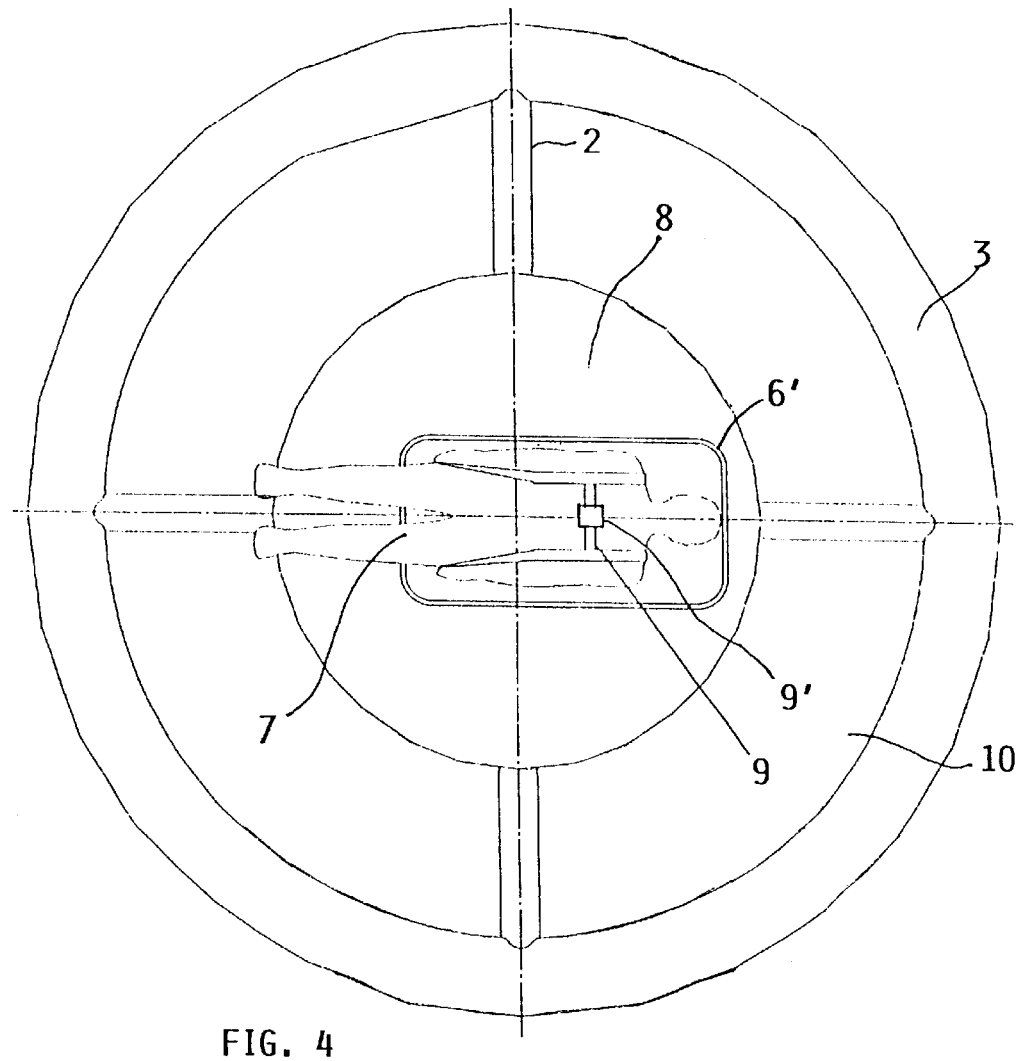
FIG. 4 is a top plan view of the apparatus according to FIG. 3.

FIGS. 3 and 4 show a second embodiment of the construction of the flying body 1. In general, the same reference numbers are used to designate the same or similar components in FIGS. 3 and 4 on the one hand, and in FIGS. 1 and 2 on the other hand. A redundant description of these components will not be provided. The primary difference between this embodiment of FIGS. 3 and 4 and the embodiment of FIGS. 1 and 2 relates to the nose structure of the conical flying body. In the embodiment of FIGS. 1 and 2, the nose structure includes the spherical pneumatic damping body 5 and the circular toroidal lower inner stabilizing ring 4. On the other hand, in the embodiment of FIGS. 3 and 4, the nose structure comprises a pneumatic damping body 5' in the form of a conically tapering ring body, e.g. in the manner of a funnel or cone with an inflatable sidewall.

This nose structure of FIGS. 3 and 4 omits a separate lower stabilizing ring 4, but the upper end of the conically tapering ring body 5' incorporates, forms or acts as the lower stabilizing ring. Thus, the spoke struts 2 are connected to and extend from the upper end of the conically tapering ring body 5', and the load support element 6 is also secured to the upper end of the conically tapering ring body 5'. In this embodiment, the load support element 6 may be a load bearing membrane 8 that is secured to the upper end of the conically tapering ring body 5' to span across the hollow interior of the ring body 5', e.g. in the manner of a trampoline. Additionally, a load bearing frame 6' may be secured to the membrane 8 so as to form a load bearing backpack frame. Securing elements such as straps 9 and at least one releasable buckle 9' are secured to the membrane 8 and/or the load bearing backpack frame 6', and can be buckled to secure a person 7 to the apparatus.

In the embodiment of FIGS. 3 and 4, the nose structure has a proportionately larger vertical height, so that the spoke struts 2 have a proportionately shorter length in FIG. 3 in comparison to FIG. 1. Also, as shown in FIG. 4, this embodiment of the flying body 1 may have four of the spoke struts 2 rather than six spoke struts 2 as provided in FIG. 2. Generally, the flying body 1 can have any number of the spoke struts 2 as required for achieving the necessary stability of the deployed configuration in the specific application at hand.

Figure 5:
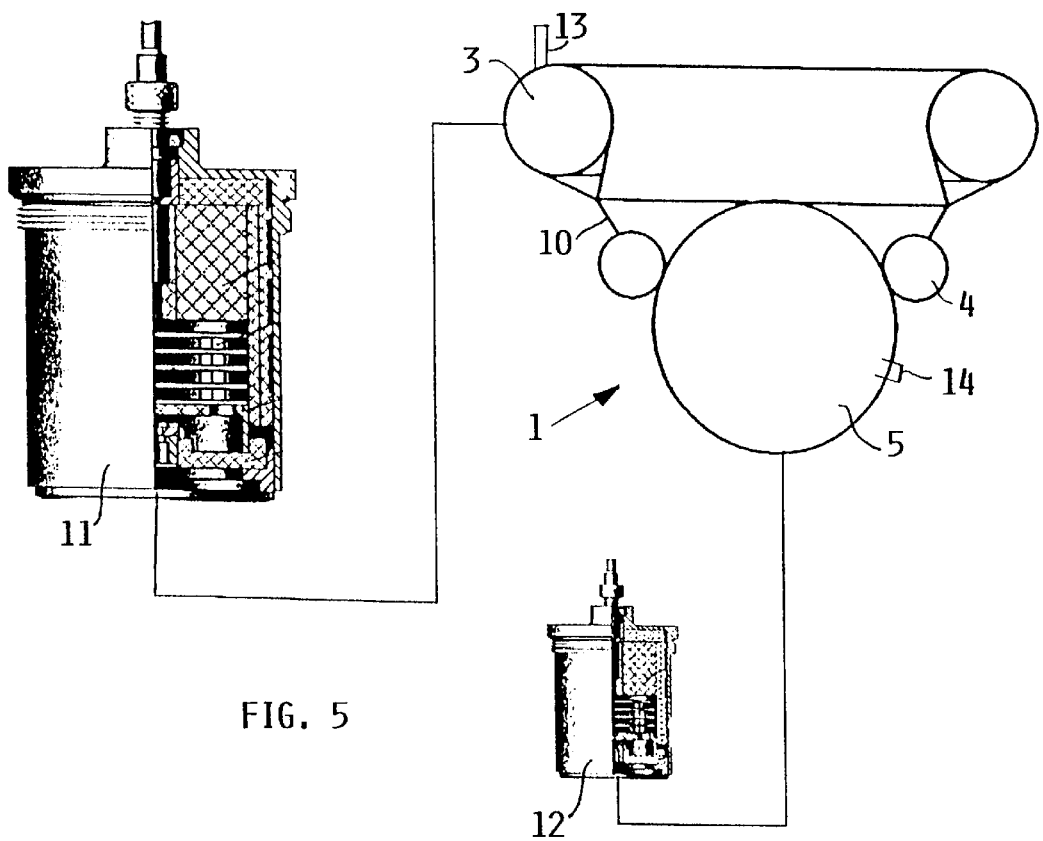
FIG. 5 is a schematic sectional diagram of the unfolded, inflated and deployed apparatus according to FIG. 1, with a schematic representation of two gas generators respectively connected to the outer stabilizing ring and the pneumatic damping body.

The pneumatic system for inflating and deploying the flying body 1 is schematically illustrated in FIG. 5. A first gas generator 11 is pneumatically connected to the upper stabilizing ring 3, the spoke struts 2, and the lower stabilizing ring 4. For example, the first gas generator 11 is pneumatically connected to the upper stabilizing ring 3, while the spoke struts 2 include open flow-through passages communicating between the upper stabilizing ring 3 and the lower stabilizing ring 4. The first gas generator 11 is connected to a pull cord, a lever, a push-button, or the like to activate the gas generation, so that the gas generator 11 will inflate the stabilizing rings 3 and 4 and the spoke struts 2. A second gas generator 12 is pneumatically connected to the pneumatic damping body 5, 5'. This gas generator 12 is also activated by manually operating a pull cord, a lever, a push-button, or the like, so as to generate a gas that inflates the pneumatic damping body 5 or 5'.

The gas generation is preferably carried out in a sudden explosive manner, so that the inflation of the flying body 1 is similarly carried out in a rather rapid shock-like manner, e.g. like an automotive occupant restraint airbag being inflated. For example, the gas generators have a gas generation time and thus fully inflate the inflatable components of the flying body 1 in a time range from 20 to 40 milliseconds. The gas generators 11 and 12 may have any conventionally known construction and operation. The gas generators 11 and 12 may be mounted on the load support receiver or element 6, e.g. on the backboard or load-bearing frame of the backpack.

The gas generators are sized to provide a slight overpressure or over-inflation of the inflatable components connected thereto. For example, the inflatable aerodynamic braking drag structure including at least the upper stabilizing ring 3 and the spoke struts 2 may have an example volume of 2.99 m³, whereby the first gas generator 11 is adapted to provide an inflation gas volume of 3 m³. Similarly, while the pneumatic damping body 5, 5' has an example volume of 0.697 m³, the second gas generator 12 is adapted to provide an inflation gas volume of 0.7 m³. Thereby, the inflatable components of the flying body 1 are surely and reliably inflated to a substantially firm, substantially rigid, self-supporting form-stable condition, to ensure that the flying body 1 maintains its conical deployed configuration during the descent flight, and does not collapse or fold due to the aerodynamic forces applied thereto.

FIG. 5 further schematically shows an optional deflation system including a first deflation or vent valve 13 provided on the upper stabilizing ring 3, and a second deflation or vent valve 14 provided on the pneumatic damping body 5, 5'. These vent valves 13 and 14 are adapted to open or rupture when a certain excessive pressure threshold is exceeded, and thereafter vent gas out of the inflatable structure at a controlled rate. When the flying body 1 touches down or lands after a rescue descent, the impact force exerted on the aerodynamic damping body 5, 5' causes the valve 14 to open or rupture and vent gas from the damping body, thereby cushioning, dissipating, time-distributing, and damping the impact energy. The first vent valve 13 connected to the upper stabilizing ring 3 acts in a similar manner.

While FIG. 5 shows the pneumatic system components in connection with a flying body 1 according to the first embodiment as shown in FIGS. 1 and 2, the same pneumatic system components and operation apply equally to the second embodiment of the flying body 1 shown in FIGS. 3 and 4.

Figure 6:
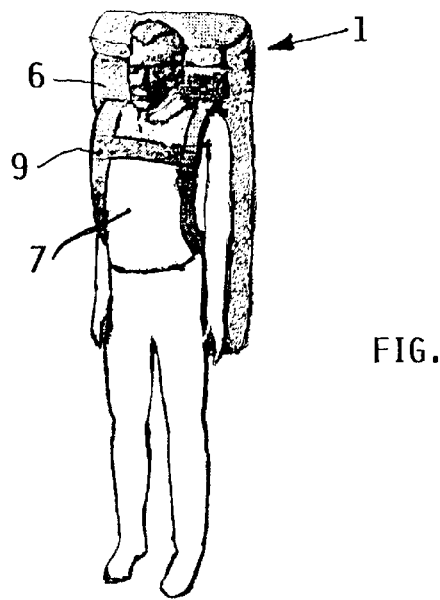
FIG. 6 is al perspective view of the inventive apparatus in the folded and stowed configuration in the manner of a backpack, secured on the back of a person to be rescued.

The above discussed figures all show the flying body 1 in its inflated, deployed condition. Before use, however, the flying body 1 is in a deflated, folded and stowed configuration in the form of a backpack as shown in FIG. 6. Particularly, the various inflatable components 2, 3, 4, 5 are deflated and folded, while the cover skin 10 and the like is also folded and is then covered or contained by outer folds or pockets thereof, or by an optional additional outer stowing envelope. The folded, stowed configuration may be maintained by a reefing cord or the like. The entire stowed unit substantially has the configuration of a backpack with a total weight under e.g. 21 kg and a height and width generally corresponding to the dimensions of the backboard or load bearing backpack frame of the load support element 6. The securing straps 9 are exposed on the side of the backboard or backpack frame facing away from the folded inflatable components.

In the event of an emergency requiring a quick evacuation from a great height of at least 5 meters, e.g. from a burning building, a person 7 puts the folded, stowed flying body 1 on his back in the manner of a backpack and then secures himself to the backpack by buckling the securing straps 9, for example with a central buckle 9' across the person's chest. The rescue device is now ready for use as will be described next in connection with the flow diagram of FIG. 7.

In a first step, the person puts on the rescue system in the manner of a backpack, and secures it on his back using the straps and buckle. In a second step, the person then takes a proper position permitting the safe actuation and deployment of the rescue system. This generally involves the person being located adjacent to an opening or egress (e.g.

a window, doorway, hole, free upper edge, etc.) of the building, tower, bridge, aircraft or other structure being evacuated, with the backpack and the person's back facing outwardly through the opening or egress out of the structure. In other words, in this step, the rescue system is oriented with the inflatable components facing away from the structure being evacuated and the load support element 6 and securing straps 9 facing toward the structure being evacuated. As an example, the person 7 may sit on the window sill of an open window of a building, with the backpack and the person's back facing outward from the building.

Figure 7:
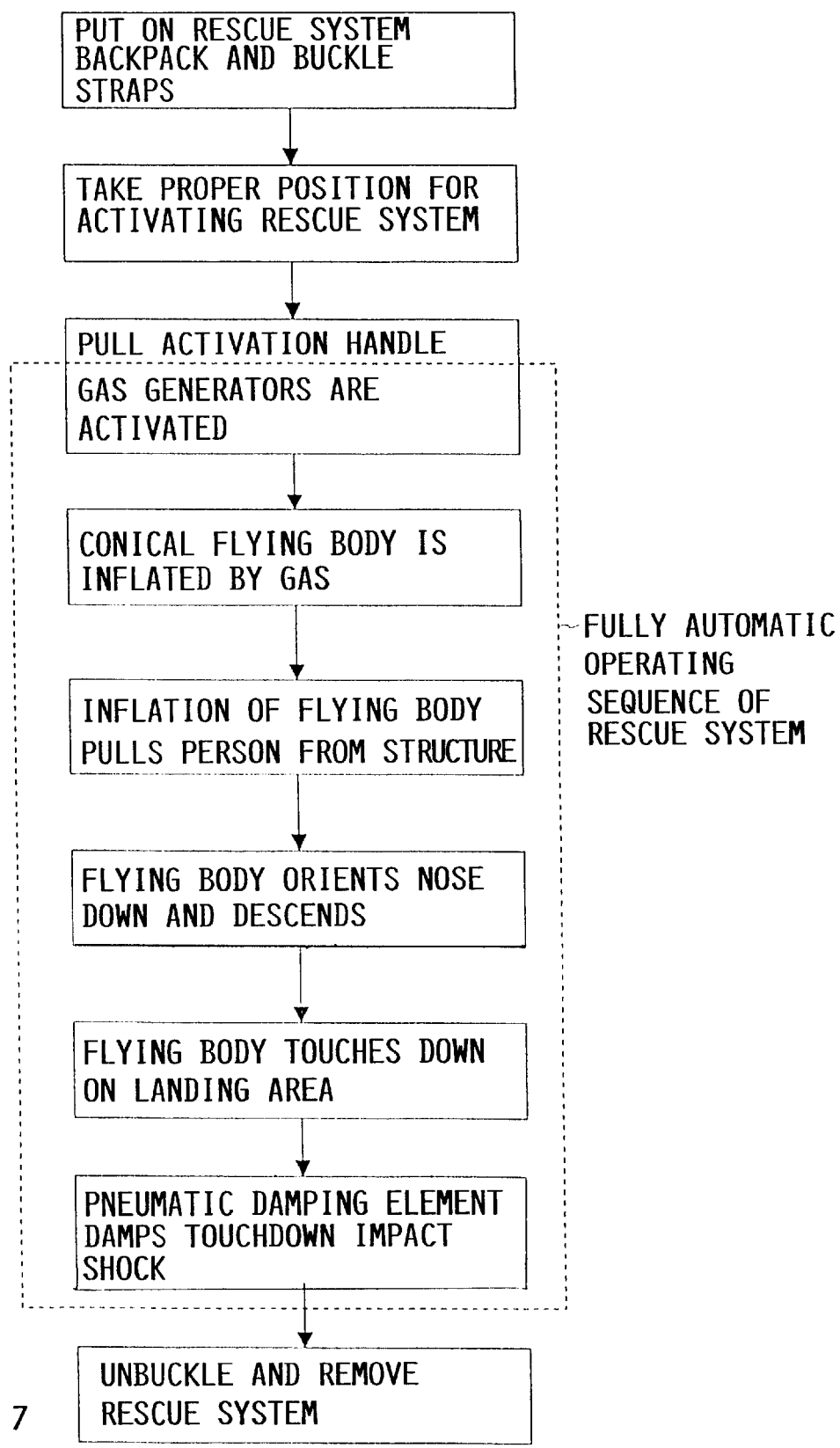
FIG. 7 is a flow diagram of the steps involved in the use of the apparatus.

At this stage, the person is ready to activate the deployment of the rescue system in a next step as shown in the flow diagram of FIG. 7. This is achieved, for example, by pulling an actuation handle which releases the reefing cord (if applicable) and actuates the one or more gas generators to inflate the inflatable components of the flying body. Once the actuating handle is manually pulled, this triggers a fully automatic or autonomous operation sequence of the rescue system. The first automatic step is the actuation of the gas generator or generators which causes the flying body 1 to inflate. As the flying body inflates in a direction out of the structure being evacuated, the inflating flying body will automatically pull or eject the person out of the structure being evacuated. Particularly, the stabilizing ring 3 will inflate and press against the outer wall of the building or the like, as the flying body 1 inflates, thereby pulling the person 7 out of the open window. As a result, the inflated flying body, with the person thereon, will then begin to descend under the influence of gravity, whereby the aerodynamic configuration and mass balance of the rescue system automatically orients the conical flying body in a nose-down attitude.

After floating down or descending at a maximum terminal velocity of not more than 8.5 m/sec, the nose structure of the flying body, including the pneumatic damping body, contacts the ground with a touchdown impact. The pneumatic damping body cushions, absorbs, damps, and dissipates a majority of the touchdown impact force and energy in the manner described above. The flying body 1 then comes to rest on the ground, for example lying on one of the conical sides of the flying body. At this point, the automatic descent sequence is completed, and the person may release the buckles and straps to take off the rescue system and leave the rescue touchdown site. If the touchdown site is on land, the above described venting valves may be used to dissipate the touchdown impact energy, and then to further deflate the flying body to facilitate the person s removal of the rescue system. On the other hand, if the touchdown site is in water, then it may be preferred not to deflate the flying body 1, so that it provides floatation in the manner of a rescue raft.

Figure 8:
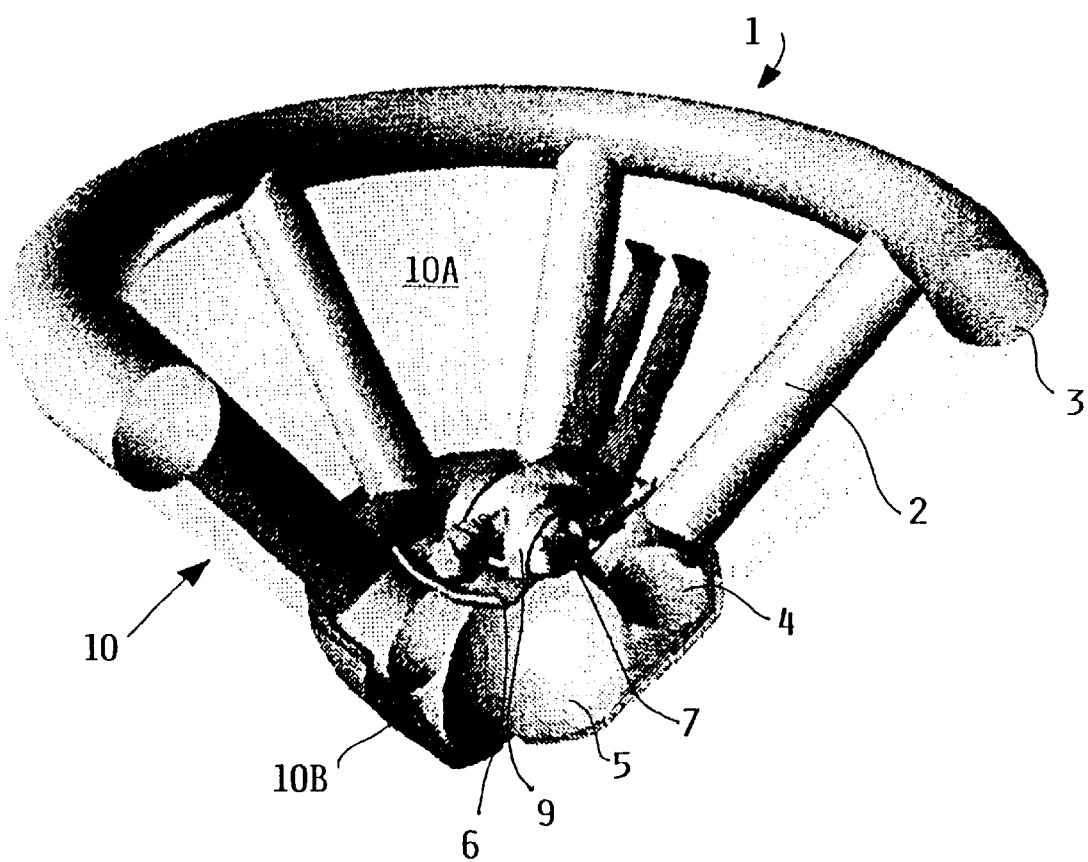
FIG. 8 is a partly broken-open perspective view of the apparatus in the deployed condition, while descending with a person secured thereon.

FIG. 8 shows a partially broken-open perspective view of the inflated deployed flying body 1, with a person 7 secured thereto, during the descent flight. The overall dimensions and aerodynamic configuration of the flying body 1 are selected and designed dependent on the weight of the person to be rescued, so as to achieve the desired design terminal velocity, and to achieve the desired design impact shock damping by the pneumatic damping body, as described above.

The general conical shape of the flying body 1 in the deployed condition preferably includes two conical cascade portions as shown in FIGS. 1 and 3. Namely, the general conical shape includes a first nose cone structure including the pneumatic damping body 5 or 5' and optionally the lower stabilizing ring 4, and a second conical frustum structure including the spoke struts 2, the upper outer stabilizing ring 3, and the cover skin portion 10A. These two structures have respective different conical diameters or even different conical taper angles, so that the overall shape is not a perfectly smooth single cone, but rather includes a stepped transition between these two conical structures. Thereby, the aerodynamic properties can be improved or tailored. Alternatively, it is possible to provide a single conical exterior surface if desired.

As is apparent from the preceding discussion, use of the present inventive rescue system does not require any special skills, training, or experience of the person being rescued. It is also significant that use of the present rescue system does not require the person to overcome a psychological barrier of jumping out of a building or other structure being evacuated. Instead, the rescue system, while being inflated, automatically pulls or ejects the person out of the structure being evacuated as described above. Alternatively, it would also be possible for the person to jump out of or away from the structure being evacuated, while pulling the actuating handle, if it is not possible to stand or sit in an appropriate position for the automatic ejection out of the structure as described above. Furthermore, since the person is secured and enclosed within the inner space of the flying body, the person is protected, from below and from the sides, against open flames and debris during the descent, and against impact with the wall of the building or other obstacles during the descent and then during the touchdown.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for enabling a person or cargo to descend from an elevation higher than a landing area, wherein said apparatus is unfoldable and inflatable into a deployed configuration having a generally conical outer shape with a narrower nose end and a wider end opposite thereto and a hollow inner space, and wherein said apparatus in said deployed configuration comprises:

an inflatable outer stabilizing ring at said wider end;

a nose structure including an inflatable central pneumatic damping element at said narrower nose end;

plural inflatable spoke struts extending conically between said nose structure and said outer stabilizing ring;

a cover skin arranged on and spanning between said spoke struts to define at least a portion of said generally conical outer shape;

at least one gas generator pneumatically connected to and adapted to inflate said outer stabilizing ring, said central pneumatic damping element, and said spoke struts; and a load support element that is adapted to receive the person or cargo thereon and that is arranged and secured in or on said nose structure at a location on or above said central pneumatic damping element in said deployed configuration.

2. The apparatus according to claim 1, wherein said apparatus is further deflatable and foldable into a stowed configuration, and wherein said at least one gas generator is actuatable to inflate said outer stabilizing ring, said central pneumatic damping element and said spoke struts and thereby to deploy said apparatus from said stowed configuration to said deployed configuration.

3. The apparatus according to claim 2, wherein said stowed configuration is a backpack configuration adapted to be worn and carried on the back of the person, and further comprising securing straps that are secured to said load support element and adapted to secure said apparatus onto the person with the load support element on the back of the person.

4. The apparatus according to claim 1, wherein said load support element comprises a flexible membrane arranged in, on or above said central pneumatic damping element.

5. The apparatus according to claim 1, wherein said load support element comprises a rigid load bearing frame.

6. The apparatus according to claim 1, wherein said load support element comprises a rigid load bearing platform.

7. The apparatus according to claim 1, further comprising securing straps with at least one buckle, which are secured on said load support element and which are adapted and configured to be secured about the shoulders and chest of the person with the load support element arranged on the back of the person.

8. The apparatus according to claim 1, wherein said hollow inner space is surrounded and enclosed by said nose structure, said spoke struts, said outer stabilizing ring and said cover skin, and is open to an external environment outside of said apparatus through an open inner diameter of said outer stabilizing ring at said wider end.

9. The apparatus according to claim 1, wherein said central pneumatic damping element comprises an inflatable ring element.

10. The apparatus according to claim 9, wherein said inflatable ring element has a hollow conically tapering inflated shape that forms a tapered conical frustum nose tip portion of said nose structure at said narrower nose end.

11. The apparatus according to claim 1, wherein said central pneumatic damping element comprises an inflatable spherical element that forms a rounded nose tip portion of said nose structure at said narrower nose end.

12. The apparatus according to claim 11, wherein said nose structure further comprises an inflatable inner stabilizing ring connected to said central pneumatic damping element, and wherein said spoke struts extend conically between said inner stabilizing ring and said outer stabilizing ring.

13. The apparatus according to claim 1, wherein said nose structure further comprises an inflatable inner stabilizing ring connected to said central pneumatic damping element, and wherein said spoke struts extend conically between said inner stabilizing ring and said outer stabilizing ring.

14. The apparatus according to claim 1, wherein said at least one gas generator comprises a first gas generator pneumatically connected to said outer stabilizing ring and a second gas generator that is separate from said first gas generator and is pneumatically connected to said central pneumatic damping element.

15. The apparatus according to claim 1, wherein said generally conical outer shape spans a conical angle in a range from 80° to 100°.

16. The apparatus according to claim 1, wherein said generally conical outer shape spans a conical angle of about 90°.

17. The apparatus according to claim 1, wherein said generally conical outer shape is a circular conical outer shape.

18. The apparatus according to claim 1, wherein said apparatus is so configured in said deployed configuration such that said apparatus is self-orienting with said narrower nose end oriented downward and said wider end oriented upward in a free-fall descent of said apparatus with the person or cargo on the load support element.

19. The apparatus according to claim 1, wherein said apparatus in said deployed configuration has a center of gravity relatively closer to said narrower nose end and a center of aerodynamic drag relatively closer to said wider end in a free-fall descent of said apparatus with the person or cargo on said load support element.

20. The apparatus according to claim 1, wherein said apparatus in said deployed configuration is so configured as to limit a free-fall descent velocity of said apparatus with the person or cargo on said load support element to a maximum terminal velocity of not more than 8.5 m/sec.

21. The apparatus according to claim 1, wherein said apparatus is adapted to be deployed to said deployed configuration and utilized to descend from any elevation of at least 5 m.

22. A method for a person to descend from a structure at an elevation of at least 5 meters above a landing area, using the apparatus according to claim 1, which is initially deflated and folded into a stowed configuration having a compact package shape and which is unfoldable and inflatable from said stowed configuration into said deployed configuration having said generally conical outer shape, said method comprising the following steps:

a) securing said apparatus in said stowed configuration on a person's back in the manner of a backpack;

b) positioning said person adjacent to an egress of said structure with said apparatus and said person's back facing outwardly away from said structure;

c) actuating at least one said gas generator to inflate and deploy said apparatus from said stowed configuration to said deployed configuration, whereby an inflation of said apparatus pulls said person out of and away from said structure;

d) descending said person from said structure to said landing area with said apparatus in said deployed configuration, wherein said generally conical outer shape is oriented with said narrower nose end thereof pointed downward; and e) touching said apparatus down onto said landing area while a touchdown impact is cushioned by said pneumatic damping element of said apparatus.

* * * * *